Nov. 20, 1962 H. LAICH 3,065,004
PIPE MOUNTING
Filed March 21, 1961
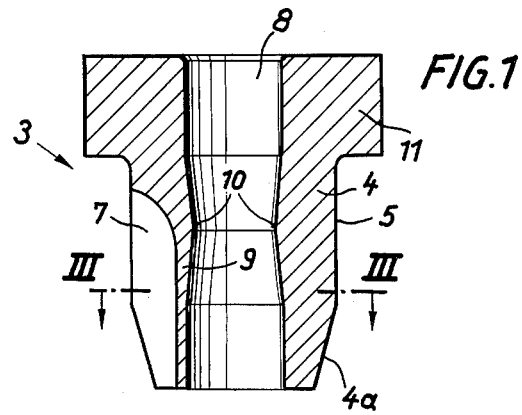
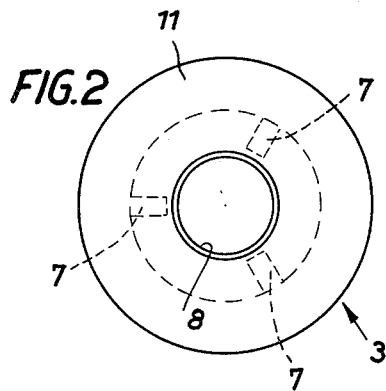
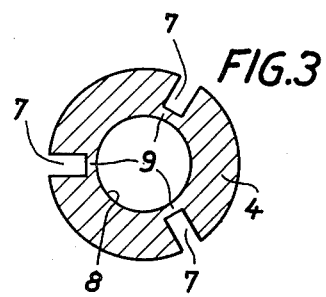
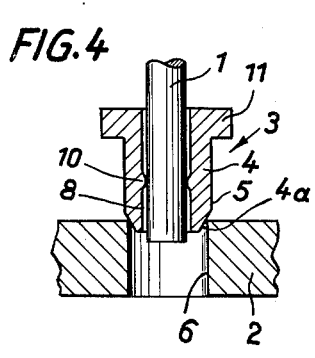
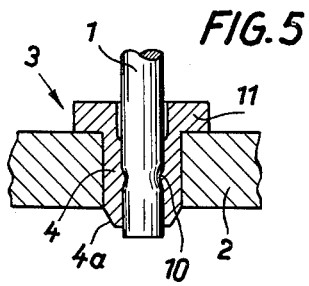
INVENTOR.
HERMANN LAICH
BY
Harness, Dickey & Pierce
ATTORNEYS

United States Patent Office 3,065,004
Patented Nov. 20, 1962

3,065,004
PIPE MOUNTING
Hermann Laich, Stuttgarter Strasse 89, Fellbach,
Wurttemberg, Germany
Filed Mar. 21, 1961, Ser. No. 97,376
Claims priority, application Germany Mar. 30, 1960
1 Claim. (Cl. 287—20)

The present invention relates to a mounting element for securing a pipe within a bore in a wall, and it is an object of the invention to provide such a mounting element which is designed so as to permit a pipe to be very easily and quickly secured within a bore in a wall and then to be securely and tightly sealed relative to the wall. A further object of the invention is to provide a pipe mounting element of the mentioned kind which may be very easily and inexpensively produced, especially since it is devoid of any screw connections.

These objects may be attained according to the invention by providing the mounting element in the form of a tubular plug consisting of a resilient plastic, preferably polyamide, which is to be fitted under pressure into a bore in a wall, and which has a smooth cylindrical outer surface with longitudinal grooves therein of a depth so as to leave only relatively thin webs between the bottom of these grooves and the surface of a longitudinal bore in the plug, which bore is provided with a constriction and is adapted to receive the pipe which is to be connected to the wall.

The objects, features, and advantages of the present invention will become more clearly apparent from the following detailed description thereof, particularly when the same is read with reference to the accompanying drawings, in which—

FIGURE 1 shows an enlarged longitudinal section of a pipe mounting element according to the invention;

FIGURE 2 shows a plan view thereof;

FIGURE 3 shows a cross section taken along line III—III of FIGURE 1;

FIGURE 4 shows, on a smaller scale, a longitudinal section of a pipe mounting element slightly different from the mounting element according to FIGURES 1 to 3 and with a pipe therein in the position before being inserted into a wall; while FIGURE 5 shows a longitudinal section of the parts according to FIGURE 4 after the pipe has been firmly connected to the wall.

For connecting a pipe 1 to a wall 2, for example, of a machine housing, the present invention only requires a single mounting element 3 which consists of a tubular plug portion 4 with a smooth cylindrical outer surface 5 of a diameter slightly larger than the diameter of a bore 6 in wall 2 into which plug 4 is to be inserted. The outer surface 5 of the plug portion 4 is provided with longitudinal grooves 7 of such a depth that only a thin web 9 remain between the bottom of the longitudinal grooves 7 and the surface of the longitudinal bore 8. This longitudinal groove 8 into which pipe 1 may be inserted has a constriction 10 which is preferably of a double conical shape, as shown in FIGURE 1.

The plug portion 4 is tapered on its end 4a which is to be inserted into wall 2. On its outer end, mounting element 3 has an enlarged head 11. The entire element 3 is made of a resilient plastic, preferably polyamide, which is slightly resiliently deformable but still possesses a sufficient solidity in order to insure a tight connection with the wall of bore 6 in wall 2 and with the outer surface of pipe 1.

For securing pipe 1, which may consist of metal or plastic, to the wall 2 by means of the mounting element 3, pipe 1 is at first inserted into the longitudinal bore 8 of the mounting element, for example, so that the end of the pipe coincides substantially with or protrudes slightly from the tapered end 4a of the plug portion 4. This inserting operation causes no difficulty since the diameter of bore 8 in mounting element 3 is slightly larger than the diameter of pipe 1. Even the diameter of the constriction 10 is of such a size that pipe 1 may be pushed through the same without being clamped thereby. Thereupon, mounting element 3 with pipe 1 therein is placed against the edge of bore 6 in the manner as illustrated in FIGURE 4, so that the tapered end 4a projects slightly into bore 6. The plug portion 4 is then driven into bore 6 by a pressure or by impacts upon the enlarged head 11 by means of a suitable tool until head 11 engages upon the outer surface of the wall, as shown in FIGURE 5. In the event, however, that pipe 1 is again to be removed from wall 1, the plug portion 4 may be driven into bore 6 only so far that a small gap remains between head 11 and the outer surface of the wall into which a suitable tool may later be inserted to lift the plug portion 4 out of bore 6. The plug portion 4 may also be driven into bore 6 by placing the bifurcated end of a strip of a hard material around pipe 1 and upon head 11 and by then hitting the metal strip with a hammer to drive the plug portion 4 into bore 6. The plug portion 4 will then be resiliently compressed at the longitudinal grooves 7, whereby a very secure connection will be produced between wall 2 and mounting element 3 which also seals pipe 1 to wall 2 securely and tightly against high liquid or gas pressures. When the plug portion 4 is being compressed, the constriction 10 will be pressed with great force against pipe 1 which may thereby be deformed to the particular extent as may be desired. This may result in a slight inward compression of the wall of the pipe, as indicated in FIGURE 5, which will interconnect the pipe so firmly with the mounting element 3 that it can no longer be withdrawn therefrom. The connection between pipe 1 and wall 2 is absolutely tight and will prevent a leaking of liquids or gases even at very high pressures of, for example, 50 atm. and more.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

A pipe mounting element for securing a pipe of predetermined diameter in an aperture of larger predetermined diameter formed in a wall of substantial thickness, comprising a member integrally formed of a resilient plastic material, said member having a shank section and a head section at one end of said shank section, said shank section having an exterior surface of cylindrical shape extending substantially from the head section along a major portion of the shank section, the unstressed diameter of said surface being slightly greater than said aperture diameter, said head section having a surface extending outwardly from said shank section and adapted to engage the outer wall surface when the shank section is inserted in said aperture, a longitudinal bore in said member extending through said head and shank sections, said bore being generally cylindrical and of slightly larger diameter than said pipe diameter but having an annular inward constriction at an intermediate portion thereof, said constriction being spaced axially from said head section surface a distance substantially less than the wall thickness, and a plurality of longitudinally disposed circumferentially spaced slotted portions extending radially inwardly from the outer surface of said shank section, the depth of said slots being such that the remaining cross-sectional areas between the bottoms of said slots and said bore comprise relatively thin webs.

References Cited in the file of this patent

UNITED STATES PATENTS

| | | |
|---|---|---|
| 2,044,392 | Lord | June 16, 1936 |
| 2,225,472 | Franklin | Dec. 17, 1940 |
| 2,830,792 | Sears | Apr. 15, 1958 |
| 2,831,737 | Jacoby | Apr. 22, 1958 |
| 2,844,125 | Wehn | July 22, 1958 |